United States Patent
Krishnaswamy et al.

(10) Patent No.: US 8,353,317 B2
(45) Date of Patent: Jan. 15, 2013

(54) SOFT CRACK ARRESTORS FOR PIPELINES

(76) Inventors: Prabhat Krishnaswamy, Columbus, OH (US); Gery Wilkowski, Columbus, OH (US)

( * ) Notice: Subject to any disclaimer, the term of this patent is extended or adjusted under 35 U.S.C. 154(b) by 572 days.

(21) Appl. No.: 12/634,962

(22) Filed: Dec. 10, 2009

(65) Prior Publication Data
US 2010/0084038 A1  Apr. 8, 2010

Related U.S. Application Data

(63) Continuation-in-part of application No. 11/656,093, filed on Jan. 22, 2007, now abandoned.

(60) Provisional application No. 60/761,202, filed on Jan. 23, 2006.

(51) Int. Cl.
*F16L 55/18* (2006.01)
*F16L 9/00* (2006.01)

(52) U.S. Cl. .......................... 138/172; 138/99

(58) Field of Classification Search .................. 138/172, 138/99
See application file for complete search history.

(56) References Cited

U.S. PATENT DOCUMENTS

| | | | | | |
|---|---|---|---|---|---|
| 3,349,807 | A | * | 10/1967 | Penman ......................... | 138/172 |
| 3,457,963 | A | * | 7/1969 | Hardwick ...................... | 138/172 |
| 3,698,746 | A | * | 10/1972 | Loncaric ...................... | 285/288.8 |
| 3,870,350 | A | * | 3/1975 | Loncaric ...................... | 285/288.8 |
| 4,001,054 | A | * | 1/1977 | Makepeace .................... | 148/220 |
| 4,148,127 | A | * | 4/1979 | Somerville ..................... | 29/523 |
| 4,176,691 | A | * | 12/1979 | Jude et al. ..................... | 138/103 |
| 4,180,104 | A | * | 12/1979 | Park et al. ..................... | 138/172 |
| 4,195,669 | A | * | 4/1980 | Ives et al. ..................... | 138/178 |
| 4,224,966 | A | * | 9/1980 | Somerville ................... | 138/172 |
| 4,284,107 | A | * | 8/1981 | Grose .......................... | 138/172 |
| 4,327,473 | A | * | 5/1982 | Somerville ..................... | 29/447 |
| 4,559,974 | A | * | 12/1985 | Fawley ........................ | 138/172 |
| 4,700,752 | A | * | 10/1987 | Fawley ........................ | 138/172 |
| 5,632,307 | A | * | 5/1997 | Fawley et al. ................. | 138/99 |
| 5,683,530 | A | * | 11/1997 | Fawley et al. ................. | 156/94 |
| 6,302,357 | B1 | * | 10/2001 | Kalisz ............................ | 244/30 |

* cited by examiner

*Primary Examiner* — James Hook
(74) *Attorney, Agent, or Firm* — Mueller Law, LLC; Jerry K. Mueller, Jr.

(57) ABSTRACT

An arrestor for arresting an axial ductile propagating fracture in a pipeline transporting a high-energy fluid is made from a material such that the arrestor deforms sufficiently when encountering a propagating fracture that the propagating fracture continues at least under the arrestor but the arrestor has enough strength that it ceases the crack propagation without ring-off of the pipeline. The material is filled with fiber characterized by having a stress-strain curve that passes thru the ranges between about 25 and 200 ksi in stress, and a deformation ranging from between about 5% strain and 35% strain, and having a diameter ranging between about 0.002 and 0.020 inches.

12 Claims, 4 Drawing Sheets

SOFT CRACK ARRESTORS FOR PIPELINES

CROSS-REFERENCE TO RELATED APPLICATIONS

This application is a continuation-in-part of application Ser. No. 11/656,093, filed on Jan. 22, 2007; and claims priority to U.S. provisional application Ser. No. 60/761,202, filed on Jan. 23, 2006.

STATEMENT REGARDING FEDERALLY SPONSORED RESEARCH

Not applicable.

BACKGROUND

The present invention generally relates to pipeline cracks and more particularly to arresting ductile propagating fractures without "ring-off".

Axial crack arrest capability is one design consideration for pipelines (or simply "pipes") containing and transporting high-energy fluids. A "high-energy fluid" is one that does not decompress quickly, such as natural gas, rich natural gas with heavier hydrocarbon additives, or liquid $CO_2$. A pipeline with oil or water in it will decompress rapidly and a crack would quickly arrest in such a case.

Once an axial fracture initiates, it can propagate in a brittle manner or in a ductile manner. Modern pipeline steels can be designed readily to avoid a brittle fracture, which propagate along the pipe length at about 1,500 feet/second or greater. However, ductile propagating fractures, which propagate between about 300 and about 1,200 feet/second in high-energy pipelines, are more difficult to control. The most common causes of such propagating fractures are corrosion and third-party damage to the pipeline from, for example, excavation or construction equipment.

Crack arrestors are designed and installed on pipelines to restrict uncontrolled propagating ductile fractures down the length of the pipeline. These crack-arrestors usually are mechanical devices installed on the pipeline at regular spaced intervals to arrest ductile fracture instantaneously upon encountering this device.

A variety of crack arrestors have been proposed:
Wilkowski, G., Scott, P., and Maxey, W., "Design and Optimization of Mechanical Crack Arrestors for Pipelines," NG-18 Report 134, July 1983
U.S. Pat. No. 4,327,473 4,559,974 4,676,276 4,700,752 4,195,669 4,180,104 4,176,691 4,148,127 4,224,966 4,284,107

Most of these crack arrestors are designed to stop further propagation without consideration to how the crack is arrested, i.e., whether the pipe is thrown out of the ditch during the fracture arrest event or stopped within the initial construction ditch and right-of-way of the pipeline. Frequently, crack arrest involves a full-bore opening of the pipeline when a propagating axial crack turns in the circumferential direction at the edge of the arrestor and propagates around the circumference to create a guillotine break in the pipeline. Such arrest behavior also is termed as a "ring-off" and leads to the complete severance of the pipeline. The "ring-off" behavior at the arrestor causes sections of the pipeline to be ejected from the ditch in which it was buried. In full-scale testing, large-diameter pipe sections have been thrown up to ¼-mile from the initial construction ditch when such "ring-off" arrests occurred. This distance is well outside the typical right of way of the pipeline, not to mention quite dangerous to personnel and property in the area.

BRIEF SUMMARY

An arrestor for arresting an axial ductile propagating fracture in a pipeline transporting a high-energy fluid is made from a material such that the arrestor deforms sufficiently when encountering a propagating fracture that the propagating fracture continues at least under the arrestor but the arrestor has enough strength that it ceases the crack propagation without ring-off of the pipeline. The material is filled with fiber characterized by having a stress-strain curve that passes through the range between about 25 and 200 ksi in stress, and a deformation range from between about 5% strain and 35% strain, and having a diameter ranging between about 0.002 and 0.020 inches. These limit values for the material characteristics (stress & strain) of the arrestor structure must hold for ambient temperatures that range from −23° C. (−10° F.) to +40° C. (104° F.). Additionally, these limit values must hold for loading rates that correspond to the arrestor to reach its maximum load within about 1.2 to 7 milliseconds.

BRIEF DESCRIPTION OF THE DRAWINGS

For a fuller understanding of the nature and advantages of the present invention, reference should be had to the following detailed description taken in connection with the accompanying drawings, in which.

The drawings will be described in greater detail below.

DETAILED DESCRIPTION

Figure 1:
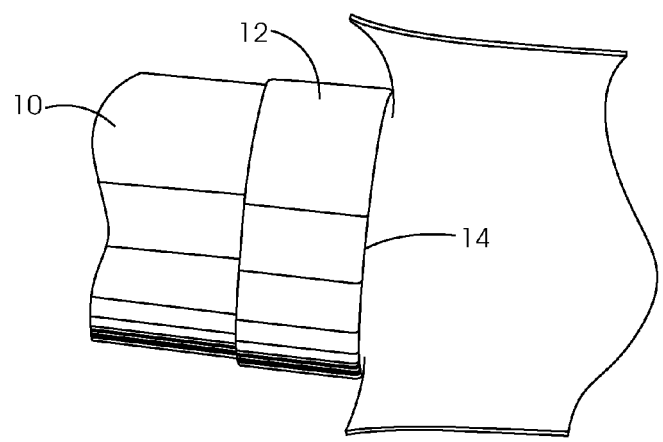
FIG. 1 is a photograph illustrating "ring-off" fractures at a prior art crack arrestor.

The subject of the current invention is an improvement over the existing crack-arrestor technology where not only does the arrest of a ductile fracture occur over a very short distance, but the arrest occurs in a manner that is termed a "soft arrest". By definition a "soft arrest" is one where the crack is stopped without the pipe separating (i.e., no "ring-off" behavior occurs) and the pipe is not ejected from the ditch where the pipeline was initially constructed. FIGS. 1 and 2 are photographs of typical "ring-off" and "soft-arrest" behavior respectively, as seen during pipe fracture experiments. In particular in FIG. 1, a pipeline, 10, has a prior art arrestor, 12, fitted about its circumference. Arrestor 12 has a leading edge, 14, at which location ring-off fractures occur.

Figures 2A, 2B:
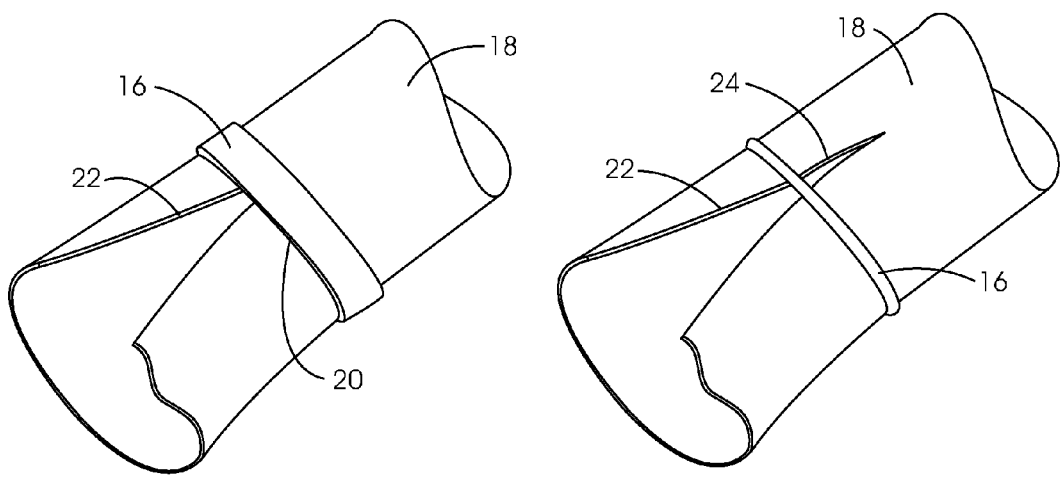
FIG. 2 is a photograph illustrating the inventive "soft arrest" behavior at an inventive soft crack arrestor.

In FIGS. 2A and 2B, the disclosed arrestor, 16, is fitted about the circumference of a pipeline, 18. Arrestor 16 has a leading edge, 20. In FIG. 2A, a crack, 22, runs along the longitudinal extent of pipeline 18 up to leading edge 20 of arrestor 16. The soft-arrest is shown in FIG. 2B where a subsequent crack, 24, extends just beyond arrestor 16 and stops. The disclosed arrestor takes into consideration both the ductility of the crack arrestor device, as well as the optimization of the arrestor strength requirements in its design to prevent the "ring-off" type of failure. The current state-of-the-art in crack arrestor design typically involves an over-kill in strength considerations only.

There are models developed in the past for predicting the potential for axial crack propagation in pipelines and developing designs for crack arrestors to control ductile fractures. The variables that affect these predictions and designs include:
1. Gas decompression behavior,
2. Type of soil backfill (used to cover the buried pipe),
3. Pipe diameter,
4. Pipe wall thickness,
5. Pipe material (steel) strength or pipeline grade,
6. Pipe material toughness,
7. Velocity of the propagating ductile fracture,
8. Crack-arrestor shape and dimensions including thickness, length, and gap between the pipe and the arrestor,
9. Crack-arrestor material strength, and
10. Type and properties of the filler material used in the gap between crack arrestor and pipe.

The disclosed arrestor involves optimizing the typical design parameters for the crack-arrestor (variables 8-10, above) with the inclusion of an additional variable of the ductility of the arrestor, a design variable that has not been recognized in past designs. These arrestor design parameters can be adjusted for any given set of pipeline design conditions (variables 1-7) that will successfully lead to a "soft-arrest" of a propagating ductile fracture. The new design procedure accounts for the ductility of the arrestor material, which is a variable that has not been considered in the other arrestor designs, as well as optimizing the strength of the arrestor. Heretofore, generally the other arrestor designs tend to over design the strength of the arrestor, which defeats "soft arrest" type of performance. This "soft arrest" design consideration can be applied to, for example, metallic (i.e., steel), composite (i.e., fiber reinforced), a combination of metallic or composite sleeve with a softer grouting material between the metallic or composite arrestor and the pipe, or a combination of metallic and composite materials for arrestor constructions.

Figure 3:
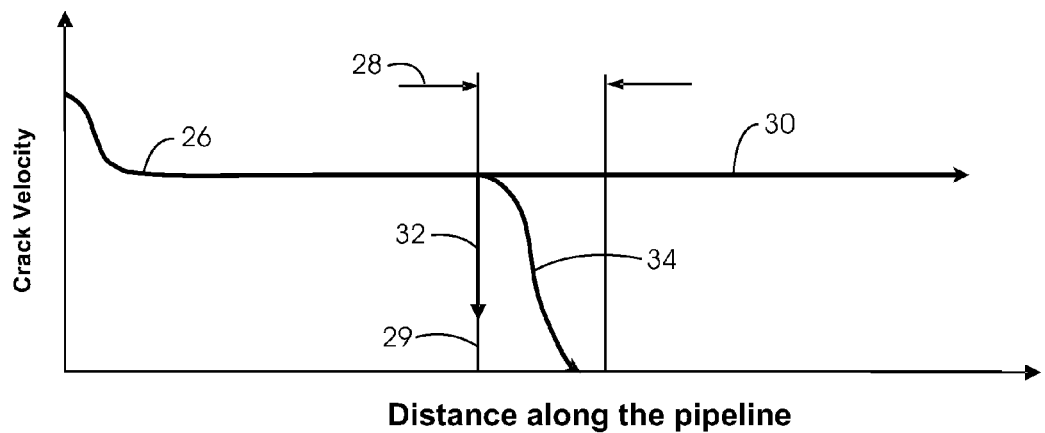
FIG. 3 plots distance along the pipeline versus crack velocity to illustrate a ductile crack propagation along a pipeline with no crack arrestor, with a prior art crack arrestor, and with the inventive soft crack arrestor.

The principle behind the working of an effective "soft crack arrestor" is as follows:
A. The strength of the arrestor material is sufficiently high to reduce the crack-driving force and limit the pipe flap opening that trails the propagating crack tip without failure, but is not significantly over designed in terms of strength and
B. There is sufficient ductility in the arrestor so that the crack slows down between the front edge of the arrestor and stops either within the arrestor region or slight after it, as illustrated in FIG. 3.

For present purposes and to explain how the SCA (soft crack arrestor) works to successfully arrest a propagating pipeline crack at high dynamic (ranging from about 1.2 to 7 milliseconds) loading rates over a range of climatic temperatures (−20° C. to +40° C.), the values of allowable strain (a no more than value and an at least value) and corresponding allowable stress (a no more than value and an at least value) are provided for the SCA.

Additionally, the fiber, that is the major load-carrying element within the SCA, will be defined with respect to its geometry (diameter) so that the fibers used for SCA application lead to a design that is cost effective and functional/useful for field operations. In this regard, the arrestor may be too strong (higher strength) which can cause "ring off" and/or the arrestor being too deformable, which can cause the crack to "slip" under the arrestor and continue to propagate.

Figure 7:
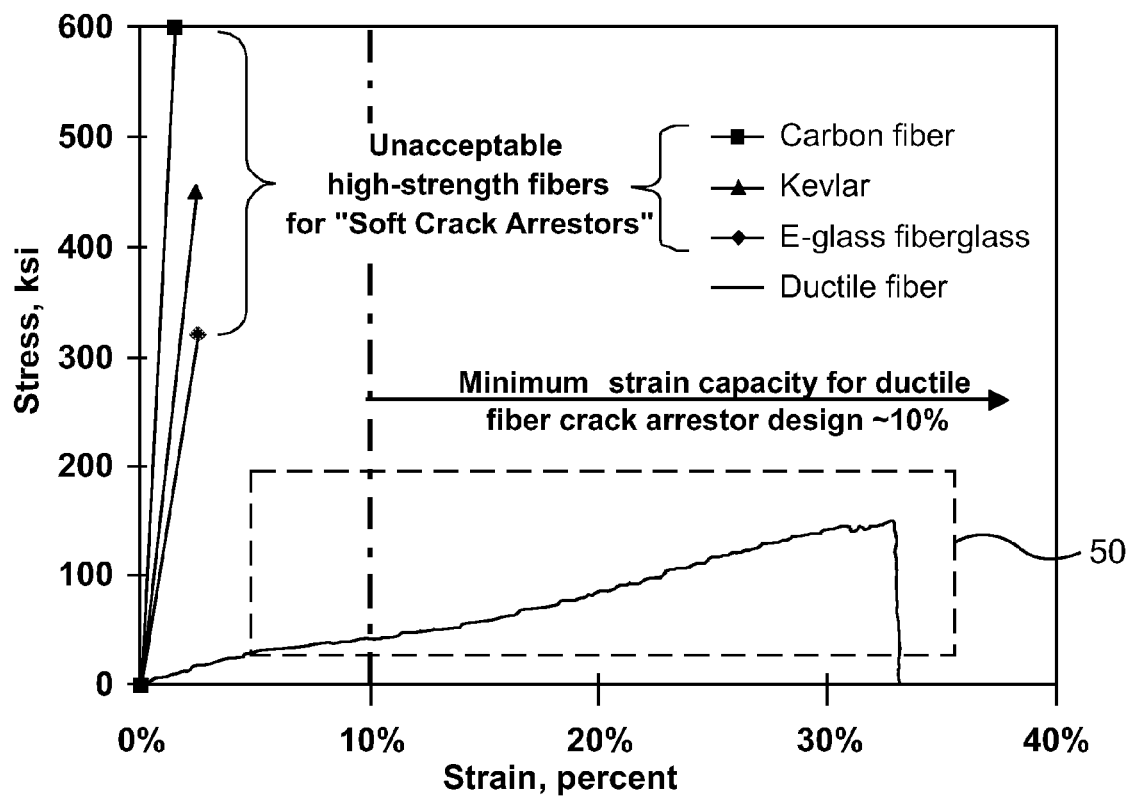
FIG. 7 compares the stress-strain data for several fibers by plotting "stress" versus "strain".

As can be seen in FIG. 7, in order for the SCA to be effective in accomplishing the goal of arresting a propagating crack in, for example, a steel gas-transmitting pipeline, the fiber stress-strain curve must pass through the following ranges of values for load (stress) carrying capability and deformation (strain) capability for the arrestor structure are:
(a) Stress (Strength): a value ranging between about 25 ksi and 200 ksi; and
(b) Strain (Deformation): value ranging between about 5% (strain) and 35% (strain).

A box, 50, in FIG. 7 shows the stress and strain limits for the disclosed SCA.

These limit values for the material characteristics (stress & strain) of the arrestor structure must hold for ambient temperatures that range from about −23° C. (−10° F.) to +40° C. (104° F.). Additionally, these limit values must hold for loading rates that correspond to the arrestor to reach its maximum load within about 1.2 to 7 milliseconds.

Also, the fibers that are employed in the fabrication of the arrestor structure have the following geometry characteristics:
(c) Diameter: ranging between about 0.002 inches and 0.020 inches.

Brittle materials, such as, for example, glass and fiberglass, will only load in an elastic manner up to failure and then suddenly break. The same is true for fibers of Kevlar and carbon. These high-strength fibers are good for reducing the amount of fiber to wrap around the pipe, but they will not stretch enough to allow the crack to propagate under the arrestor. As a result, the load from the pipe "flaps" as the crack approaches the arrestor is taken at the front edge of the arrestor. With an arrestor filled with high strength fiber, this load concentration at the front edge causes a circumferential tear in the pipe and the "ring-off" behavior that is being avoided with the disclosed "Soft Arrestor" design.

In particular, FIG. 3 plots distance along the pipeline versus crack velocity, as indicated by the curve, 26, with the width of the arrestor, 28, and leading edge of the arrestor, 29. With no arrestor, the crack propagates unabated, as indicated by the continuing line in the graph 30. With a conventional hard arrestor and consequent ring-off, the crack propagates around the circumference of the pipeline, as indicated by the sudden downward arrow 32. With the disclosed soft-crack arrestor, the crack velocity slows and the crack stops its propagation at the arrestor or just after it, as indicated by the curve 34.

Figure 4:
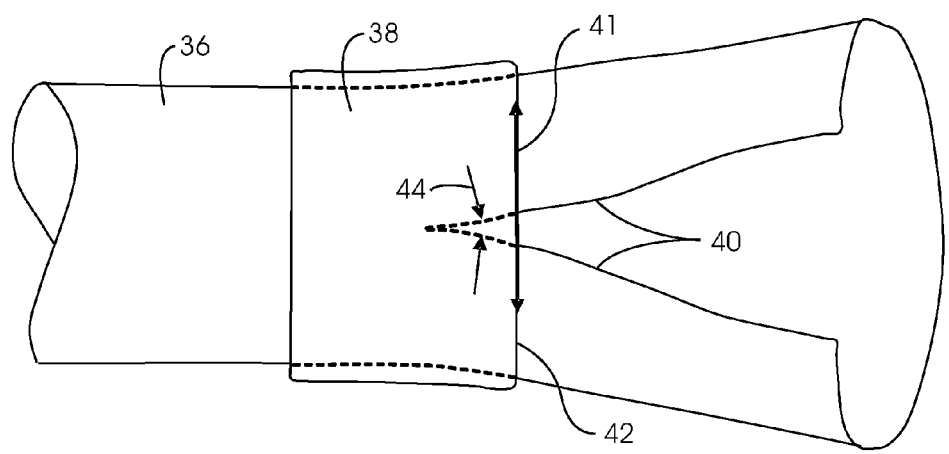
FIG. 4 is a schematic drawing of a pipeline fitted with the inventive soft crack arrestor and having an axial crack being arrested without ring-off.

A key aspect to the present invention is that the ductility of the arrestor needs to be such that the crack slides under the leading edge of the arrestor and the crack-tip-opening angle is reduced sufficiently to arrest the crack. The ductility of the arrestor is sufficient so that the load from the deforming pipeline walls against the arrestor is distributed more uniformly and is not concentrated at the edge of the arrestor. This will prevent a circumferential tear in the pipeline at the leading edge of the arrestor that would develop into a "ring off" failure mode, as illustrated in FIG. 4, for a pipeline, 36, and a soft-crack arrestor, 38, for an axial crack, 40. The amount of deformation capability, 41, in the arrestor at the leading edge, 42, is related to the crack opening shape. The crack opening shape is a function of the material toughness, and is frequently characterized by the crack-tip-opening angle, 44. By having the crack stop under the arrestor without a circumferential tear in the pipeline at the leading edge of the arrestor, the cracked pipeline will stay intact in the longitudinal direction with the rest of the pipeline and results in the desired "soft arrest".

While the invention has been described with reference to various embodiments, those skilled in the art will understand that various changes may be made and equivalents may be substituted for elements thereof without departing from the scope and essence of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. In this application all units are in the metric system and all amounts and percentages are by weight, unless otherwise expressly indicated. Also, all citations referred herein are expressly incorporated herein by reference.

Design Calculation Example

This sample calculation is for determining "soft crack arrestor" design requirements for a 1.219-mm (48-inch) diameter, 18.3-mm (0.72-inch) thick Grade 552 (X80) pipe that could carry a rich natural gas at 4.4° C. (40° F.). The operating pressure is deemed to be 80% of the specified-minimum yield-strength (80% SMYS, where 552 MPa (80 ksi) is the SMYS for Grade 552 (X80) pipe). This stress level in the pipe gives a pressure level of 13.24 MPa (1,920) psig. It is assumed that the pipeline is buried in unfrozen soil, and the minimum Charpy energy requirement for the pipe material is 200 Joules (147 ft-lb). The gas composition is assumed to be 84% methane, 9% ethane, 6% propane, and the balance is $CO_2$ and nitrogen in equal amounts.

The fracture speed anticipated from the above design conditions can be calculated from an equation-of-state program that calculated the gas decompression behavior, and the Battelle Two-Curve ductile fracture method (Maxey, W., Keifner, J. F., and Eiber, R. J., "Ductile Fracture Arrest in Gas Pipelines," A.G.A. catalogue number L32176, May 1976). In this example, the GASDECOM equation of state program was used to calculate the rich natural gas decompression behavior.

For the Battelle-Two-Curve method to work for higher-grade steels with the Charpy energy, statistical analyses of past full-scale burst tests 9 G. Wilkowski, D. Rudland, H. Xu, and N. Sanderson, "Effect of Grade on Ductile Fracture Arrest Criteria for Gas Pipelines," paper #IPC2006-10350, 2006 International Pipeline Conference) has shown that a correction factor of ~1.45 is needed, i.e., the effective Charpy energy for ductile fracture arrest is actually 200 J/1.45 or 138 Joules (102 ft-lb).

Figure 5:
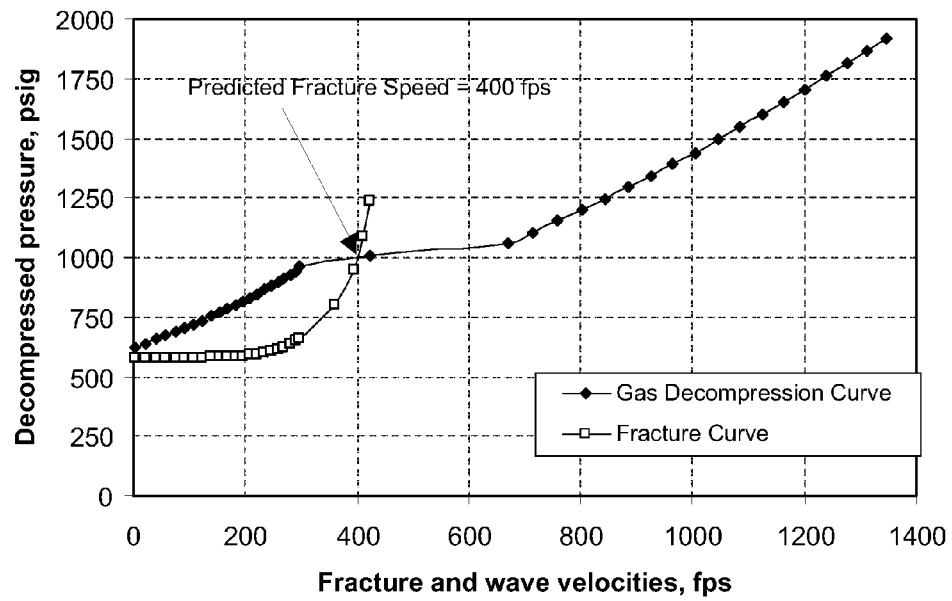
FIG. 5 is the Battelle Two-Curve results predicting fracture speed at the intersection of the fracture and decompression curves where "fracture and wave velocities, fps" is plotted against "decompression pressure, psig"

The Battelle Two-Curve results predict the fracture speed at the intersection of the fracture and decompression curves, which is illustrated in FIG. 5, where "fracture and wave velocities, fps" is plotted against "decompression pressure, psig". The predicted fracture speed in this case is 122 m/s (400 fps).

Figure 6:
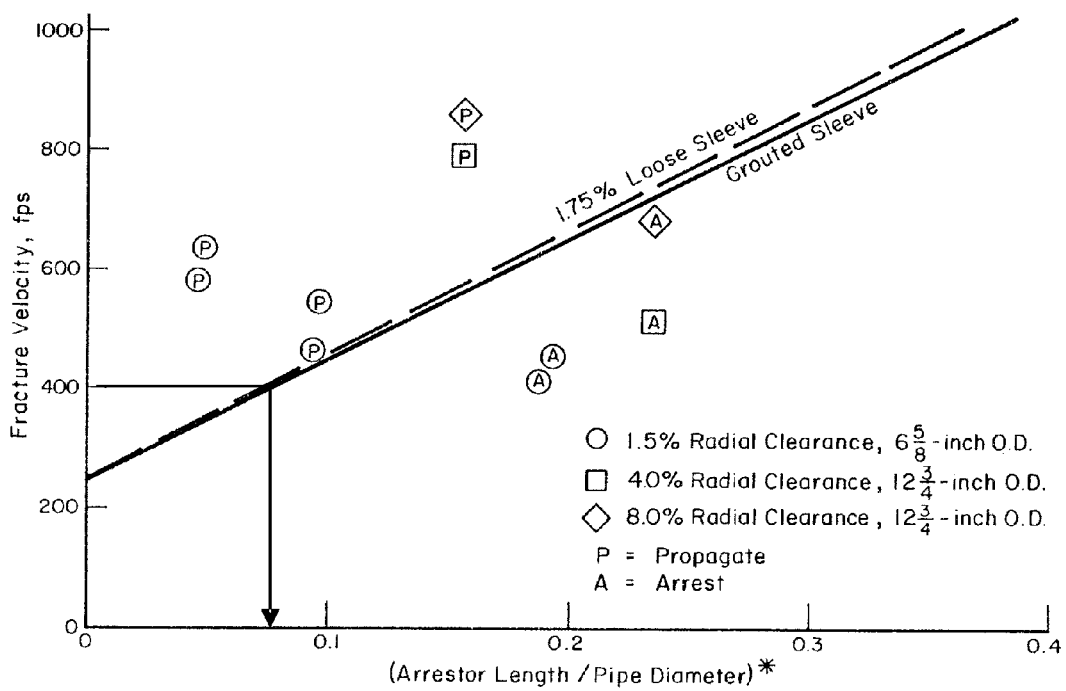
FIG. 6 plots "arrestor length/pipe diameter" versus "fracture velocity, fps" for showing the minimum length of a steel sleeve arrestor based on experimental design data.

By knowing the predicted fracture speeds, the design of arrestor strength can be determined next. The design of a steel sleeve arrestor with the same ultimate strength and thickness of the pipe is used first. The SMYS of the pipe is 552 MPa (80 ksi), and the typical yield to ultimate strengths of such pipe is 0.85. Additionally, the typical yield strength is 5% higher than the SMYS value. Hence, the typical ultimate strength for the arrestor material should be 552*1.05/0.85, which is 682 MPa (98.9 ksi). FIG. 6 (G. M. Wilkowski, D. Rudland, and B. Rothwell, "How to Optimize the Design of Mechanical Crack Arrestors," paper #IPC2006-10357, 2006 International Pipeline Conference, plot of "arrestor length/pipe diameter" versus "fracture velocity, fps") shows the minimum length of a steel sleeve arrestor based on experimental design data. At 122 m/s (400 fps) fracture speed, the minimum required steel sleeve arrestor axial length is 0.08 times the pipe diameter or a minimum required axial length of 97.8 mm (3.85 inches). A slightly conservative design would be 0.1 times the pipe diameter or an axial length of 122 mm (4.8 inches).

A different strength arrestor material can be used so long as the product of the arrest hoop strength and thickness equals that of the carrier pipeline, i.e., a composite material with an ultimate strength of 1,103 MPa (160 ksi) would have to have a minimum thickness of 18.3*1103/682 or 11.43 mm (0.45 inches).

Soft arrest conditions require two additional factors. First condition for "soft arrest" is that the strength of the arrestor should not be greater than twice the minimum strength requirements, i.e., the thickness times the arrestor hoop strength should be less than twice the thickness of the pipe times the ultimate strength of the pipe. If this higher strength is used then a ring-off fracture is likely to occur.

The second condition of the arrestor material for soft arrest is that the arrestor needs to have sufficient ductility at the front edge of the arrestor so that the load will be distributed along the axial length of the arrestor. This will avoid a concentrated load at the front edge of the arrestor that would cause the "ring-off" type fracture behavior. The arrestor minimum ductility should be such that it can accommodate the crack-tip-opening angle (CTOA) of the material as the crack reaches twice the minimum required length of the arrestor. From Rudland, D. L. Wilkowski, G., Wang, Y-Y, Horsley, D., Rothwell, B, and Glover, A., "Investigation Into The Use Of A Single Specimen For The Determination Of Dynamic Steady State Propagation Resistance In High Toughness Linepipe Steels." *Proceedings of the International Pipeline Conference* 2002, Calgary, Alberta, Canada, Sep. 29-Oct. 3, 2002, the typical CTOA value for material with this toughness is about 10-degrees. Since cracks could still be arrested if they propagate about twice the length of the arrestor, the maximum crack length past the front edge of the arrestor for this sample case would be 2*122 or 244 mm (9.6 inches). With the 10-degree crack-opening angle, the corresponding circumferential opening at the front edge of the arrestor would be 42.4 mm (1.67 inch). With a mean diameter of 1,237 mm (48.72 inches), the arrestor mean circumference is 3.888 m (153.1 inch). Hence, the material needs to have a nominal ductility to stretch 32.0 mm (1.26 inches) over the circumference. This results in a nominal or average strain at the front edge of the arrestor of 0.84%. There also would be a local strain concentration factor at the contact location of the edge of the cracks and the arrestor material. This strain concentration factor is estimated to be a factor of 3, so that the minimum-strain capacity (ductility) of the arrestor material in this example would be 2.5%.

Hence the "soft crack arrestor" design requirements for this sample case are; minimum thickness of 18.3 mm (0.72 inch), minimum required axial length of arrestor of 122 mm (4.8 inches), minimum strength of 682 MPa (98.9 ksi), maximum arrestor strength times thickness not greater than twice the product of the minimum values, and minimum arrestor material strain at failure 2.5%.

We claim:

1. An arrestor for arresting an axial ductile propagating fracture in a pipeline transporting a high-energy fluid, which comprises:
   an arrestor made from a material such that the arrestor deforms sufficiently when encountering a propagating fracture that the propagating fracture continues at least under the arrestor but ceases propagating without ring-off of the pipeline, said material filled with fiber characterized by having a stress-strain curve that passes thru the range between about 25 and 200 ksi in stress, a deformation ranging from between about 5% strain and 35% strain, and having a diameter ranging between about 0.002 and 0.020 inches.

2. The arrestor of claim 1, wherein the thickness times the arrestor hoop strength should not be greater than twice the thickness of the pipe times the ultimate strength of the pipe.

3. The arrestor of claim 2, wherein arrestor minimum ductility should be such that it can accommodate the crack-tip-opening angle (CTOA) of the material as the crack reaches twice the minimum required length of the arrestor.

4. The arrestor of claim 1, wherein arrestor minimum ductility should be such that it can accommodate the crack-tip-opening angle (CTOA) of the material as the crack reaches twice the minimum required length of the arrestor.

5. The arrestor of claim 1, which is formed from one or more of steel or fiber reinforced composite.

6. The arrestor of claim 1, wherein the fiber strength and deformation characteristics hold for ambient temperatures ranging between about −23° C. (−10° F.) to +40° C. (104° F.) and for loading rates that correspond to the arrestor to reach its maximum load within about 1.2 to 7 milliseconds.

7. A method for arresting an axial ductile propagating fracture in a pipeline transporting a high-energy fluid, which comprises the steps of:
   placing an arrestor around the circumference of said pipeline, said arrestor made from a material such that the arrestor deforms sufficiently when encountering a propagating fracture that the propagating fracture continues at least under the arrestor but ceases propagating without ring-off of the pipeline, said material filled with fiber characterized by having a stress-strain curve that passes thru the ranges between about 25 and 200 ksi in stress, and deformation ranging from between about 5% strain and 35% strain, and having a diameter ranging between about 0.002 and 0.020 inches.

8. The method of claim 7, wherein the thickness times the arrestor hoop strength should not be greater than twice the thickness of the pipe times the ultimate strength of the pipe.

9. The method of claim 8, wherein arrestor minimum ductility should be such that it can accommodate the crack-tip-opening angle (CTOA) of the material as the crack reaches twice the minimum required length of the arrestor.

10. The method of claim 7, wherein arrestor minimum ductility should be such that it can accommodate the crack-tip-opening angle (CTOA) of the material as the crack reaches twice the minimum required length of the arrestor.

11. The method of claim 7, which is formed from one or more of steel or fiber reinforced composite.

12. The method of claim 7, wherein the fiber strength and deformation characteristics hold for ambient temperatures ranging between about −23° C. (−10° F.) to +40° C. (104° F.) and for loading rates that correspond to the arrestor to reach its maximum load within about 1.2 to 7 milliseconds.

* * * * *